United States Patent
El Hafidi et al.

(10) Patent No.: US 7,248,556 B2
(45) Date of Patent: Jul. 24, 2007

(54) FAST DUPLICATION OF DIFFRACTIVE STORAGE DEVICE FOR MASS PRODUCTION

(75) Inventors: Idriss El Hafidi, Strasbourg (FR); Romualda Grzymala, Strasbourg (FR); Patrick Meyrueis, Strasbourg (FR)

(73) Assignee: Research Investment Network, Inc., Long Beach, CA (US)

( * ) Notice: Subject to any disclaimer, the term of this patent is extended or adjusted under 35 U.S.C. 154(b) by 152 days.

(21) Appl. No.: 10/512,290

(22) PCT Filed: Apr. 26, 2002

(86) PCT No.: PCT/EP02/05451

§ 371 (c)(1),
(2), (4) Date: Oct. 25, 2004

(87) PCT Pub. No.: WO03/091809

PCT Pub. Date: Nov. 6, 2003

(65) Prior Publication Data
US 2005/0259299 A1    Nov. 24, 2005

(51) Int. Cl.
*G03H 1/10* (2006.01)
(52) U.S. Cl. ............................................. 369/103
(58) Field of Classification Search ............ None
See application file for complete search history.

(56) References Cited

U.S. PATENT DOCUMENTS 4,715,670 A    12/1987  Turukhano
6,730,442 B1 *  5/2004  Sutherland et al. ............. 430/1
6,900,914 B1 *  5/2005  Tanaka et al. ................. 359/35
2001/0035990 A1 * 11/2001  Mok et al. ..................... 359/12

FOREIGN PATENT DOCUMENTS

| DE | 10022949 A1 | 11/2001 |
| WO | WO 9701133 A1 | 1/1997 |
| WO | WO 0030084 A | 5/2000 |

\* cited by examiner

*Primary Examiner*—William Korzuch
*Assistant Examiner*—Joseph Haley
(74) *Attorney, Agent, or Firm*—Steve A. Wong; Caroline T. Do

(57) ABSTRACT

A master memory device that stores a plurality of pages of information. An unexposed memory device (190) is adjacent to the master memory device (180). The unexposed memory device and the master memory device are separated by a gap. An aperture unit (130) is disposed in the gap. The aperture has a plurality of aperture openings. Each opening corresponds, in size, to an individual page constitutes of a column with specific multiplexing angles of memory in the master memory device. The aperture unit is located across a face of the master memory device such that the openings correspond to selected ones of the pages of information. A light source (120) generates a beam that transfers memory data from the master memory device to the unexposed memory device.

46 Claims, 3 Drawing Sheets

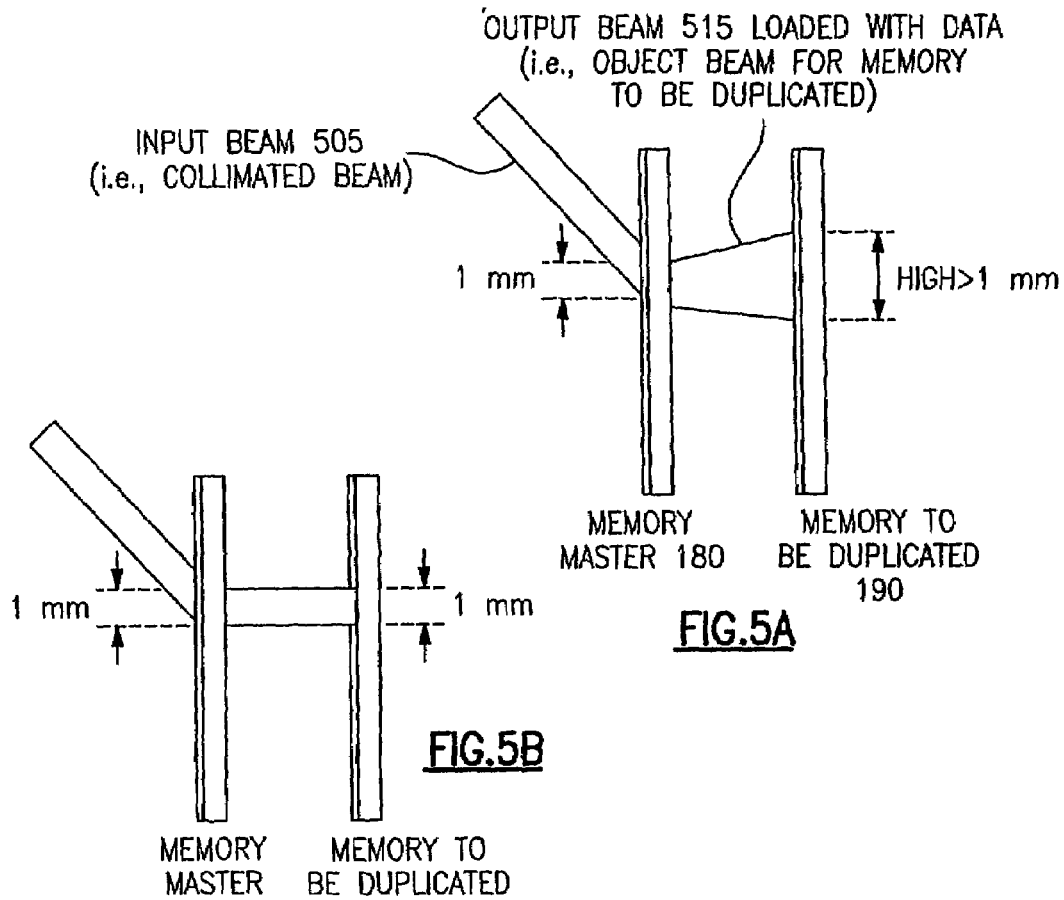
FIG.5A
FIG.5B
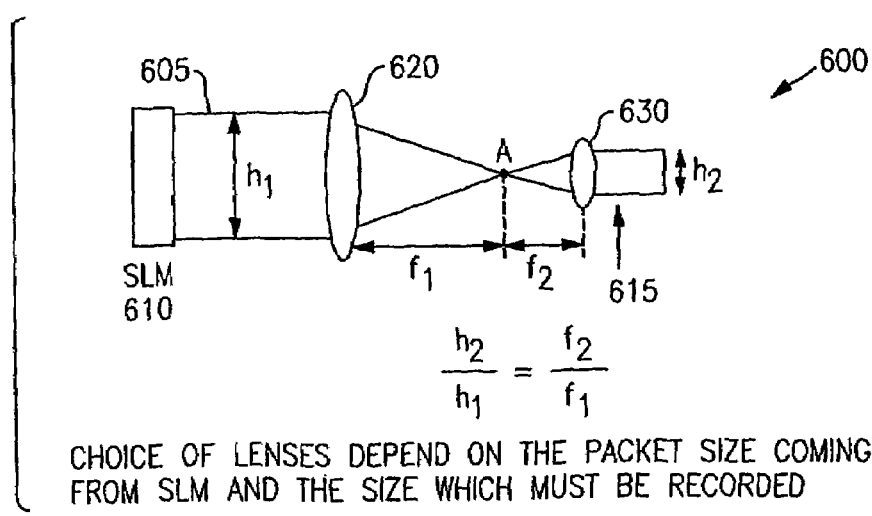
FIG.6

FAST DUPLICATION OF DIFFRACTIVE STORAGE DEVICE FOR MASS PRODUCTION

FIELD OF THE INVENTION

The present invention generally relates to photonics data memory devices. In particular, the present invention relates to duplicating a photonics data memory device.

BACKGROUND OF THE INVENTION

There is a strong interest in high-capacity data storage systems with fast data access due to an ever-increasing demand for data storage. Limitations in the storage density of conventional magnetic memory devices have led to considerable research in the field of optical memories. Holographic memories have been proposed to supersede the optical disc (CD-ROMs and DVDs) as a high-capacity digital storage medium. The high density and speed of holographic memory results from the use of three-dimensional recording and from the ability to simultaneously read out an entire page of data. The principal advantages of holographic memory are a higher information density, a short random-access time, and a high information transmission rate.

In holographic recording, a light beam from a coherent monochromatic source (e.g., a laser) is split into a reference beam and an object beam. The object beam is passed through a spatial light modulator (SLM) and then into a storage medium. The SLM forms a matrix of cells that modulate light intensity with grey levels. For instance, a valve can include phototransistors or LCD elements. The SLM forms a matrix of shutters that represents a page of binary or grey-level data. The object beam passes through the SLM, which acts to modulate the object beam with binary information being displayed on the SLM. The modulated object beam is directed to one point, after an appropriate beam processing, where it intersects with the reference beam after being routed by an addressing mechanism. It is also contemplated that for multispectral holography, the multispectral hologram may be recorded with more than one wavelength from different lasers or from the same multiline laser at the same time. In other words, the recording can be operating with several wavelengths in the holographic multiplexing process.

An optical system consisting of lenses and mirrors is used to precisely direct the optical beam encoded with the packet of data to the particular addressed area of the storage medium. Optimum use of the capacity of a thick storage medium is realized by spatial and angular multiplexing that can be enhanced by adding frequency polarization, phase multiplexing, etc. In spatial multiplexing, a set of packets is stored in the storage medium shaped into a plane as an array of spatially separated and regularly arranged subholograms by varying the beam direction in the x-axis and y-axis of the plane. Each subhologram is formed at a point in the storage medium with the rectangular coordinates representing the respective packet address as recorded in the storage medium. In angular multiplexing, recording is carried out by keeping the x- and y-coordinates the same while changing the irradiation angle of the reference beam in the storage medium. By repeatedly incrementing the irradiation angle, a plurality of packets of information is recorded as a set of subholograms at the same x- and y-spatial location.

A volume (thick) hologram requires a thick storage medium, typically a three-dimensional body made up of a material sensitive to a spatial distribution of light energy produced by interference of a coherent light beam and reference light beam. A hologram may be recorded in a medium as a variation of absorption or phase or both. The storage material responds to incident light patterns causing a change in its optical properties. In a volume hologram, a large number of packets of data can be superimposed, so that every packet of data can be reconstructed without distortion. A volume (thick) hologram may be regarded as a superposition of three-dimensional gratings recorded in the depth of the emulsion, each satisfying the Bragg law (i.e., a volume phase grating). The grating planes in a volume hologram produce change in refraction and/or absorption.

While holographic storage systems have not yet replaced current CD and DVD systems, many advances continue to be made which further increase the potential of storage capacity of holographic memories. This includes the use of various multiplexing techniques such as angle, wavelength, phase-code, fractal, peristrophic, and shift. However, methods for recording information in highly multiplexed volume holographic elements, and for reading them out, have not proved satisfactory in terms of throughput, crosstalk, and capacity.

One of the disadvantages of using three-dimensional optical storage media is an increase in the duplication time for making multiple copies of the prerecorded data media. In some, current three-dimensional optical storage media duplication is performed on a bit-by-bit basis. Each bit of information is stored in an individual volume, and each volume is written to individually. As storage capacities increase, the duplication time increases because of the greater number of individual bits to process.

Another duplication method used for holograms is an embossing process. However, this is only useful for holograms involving surface modulation and is not used for three-dimensional data storage where data is stored in the thickness of the material. Another technique is called liquid gate. Liquid gate has been used for duplicating holograms; however, it is limited in that it only works for holograms having a single reference beam and is not useful for multi-reference holograms, such as those employing multi-angular multiplexing and other multiplexing schemes.

In general, many known techniques for duplicating holograms are expensive; they result in a high percentage of defects, and do not produce a copy that is within an acceptable signal-to-noise ratio.

SUMMARY OF THE INVENTION

In accordance with one aspect of the invention, an apparatus for reproducing a diffractive memory includes a master diffractive memory unit/device having a plurality of pages of information stored thereon, and an unexposed diffractive plate/device. A fixture is used for holding the master diffractive memory unit. The fixture is adjacent to and parallel to the diffractive plate with a gap between the adjacent faces of the master and unexposed devices. A slit aperture unit is disposed in the gap between the master and unexposed memory devices. This slit aperture includes a plurality of aperture openings.

A mechanism for sliding the aperture unit across the face of the master memory unit is provided so that the slits are adjacent to selected pages of information on the master memory plate. A laser light source generates a beam that transfers the data diffractively produced from the master device to the unexposed device.

In accordance with another aspect of the invention, the master memory unit is transmissive hologram, and the unexposed memory device is exposed to the diffractive pattern after light passes through the master memory unit. In accordance with yet another aspect of the invention, the master memory unit is a reflective hologram, and the unexposed memory device is exposed to the diffractive pattern after it is reflectively diffracted from the surface of the master memory unit.

Further advantages and novel features of the present invention will become apparent to those skilled in the art from this disclosure, including the following detailed description, as well as by practice of the invention. While the invention is described below with reference to illustrative embodiments, this description is not intended to be construed in a limiting sense. Those of ordinary skill in the art having access to the teachings herein will recognize additional implementations, modifications, and embodiments, as well as other fields of use, which are within the scope of the invention as disclosed and claimed herein, and with respect to which the invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIGS. 5A and 5B are schematic representations of the operation of the apparatus shown in FIG. 1 illustrating control of the size of the copy.

FIG. 6 is an optical diagram of the lenses used to control the size of the copy hologram in accordance with the apparatus shown in FIG. 1.

DETAILED DESCRIPTION OF THE INVENTION

Figure 1:
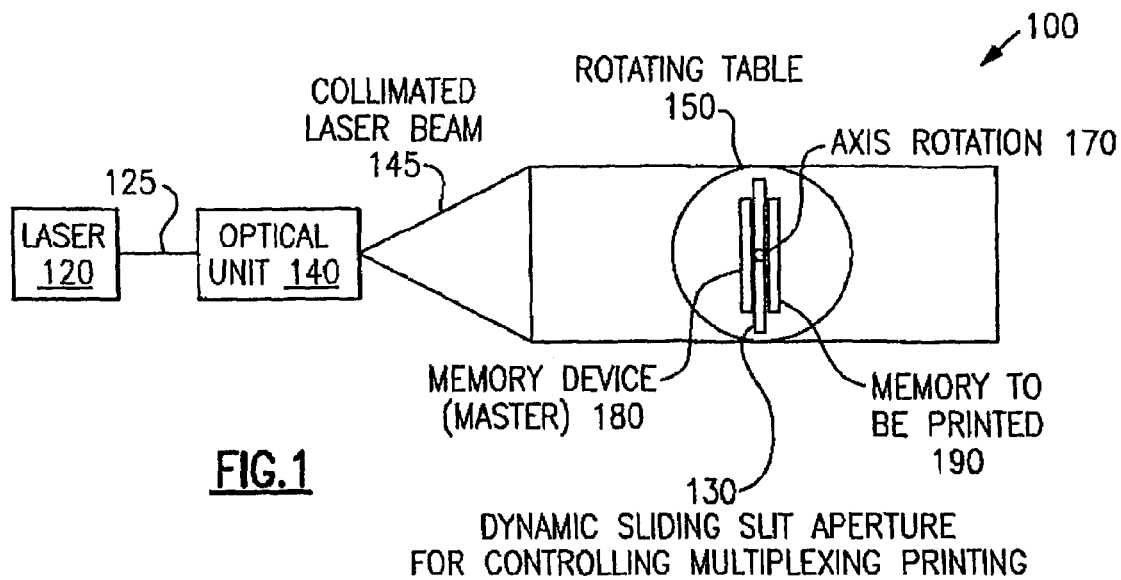
FIG. 1 is a schematic representation of an apparatus for duplicating a hologram according to one embodiment of the present invention.

Referring to FIG. 1, there is shown a schematic representation of an apparatus for duplicating a hologram according to one embodiment of the present invention. The duplicating apparatus 100 includes a laser 120, a laser beam 125, an optical unit 140, a collimated laser beam 145, a master holographic plate memory 180, a holographic plate memory to be printed 190, a dynamic sliding slit aperture 130, and a rotating table 150.

Storing/Recording Phase

The master holographic memory device 180 contains information stored during a phase of storing information. In the storing phase, a laser emits a coherent light beam that is split into two beams, a reference beam and an object beam, by means of a splitter (not shown). The object beam may be filtered and collimated. The object beam is directed to a display which displays an image to be recorded. The object beam becomes modulated by the information to be recorded by means of reflection off the display or transmission through the display.

The display may be any device for displaying a data packet in a system, such as a spatial light modulator (SLM) or liquid crystal light valve (LCLV). In one embodiment, the plurality of bits represented on the display screen of the display is presented as a two-dimensional pattern of transparent and opaque pixels (i.e., data packet). The data packet displayed is derived from any source such as a computer program, the Internet, and so forth. In an Internet storage application, the packets displayed may be formatted similarly to the packets of the Internet.

The reference laser beam interferes coherently with the object beam, the laser beam that is carrying the information to be stored, to form the interference pattern or hologram, which is stored in the master memory device 180 due to the perturbation in the refractive index. Thus, each hologram is stored at a unique angle of the reference beam. The separation between the various holograms stored within the same volume relies on the reference beam angle variation of the hologram, in order to allow its retrieval in phase with the volume only for a defined angle value. It is noted that the reference beam may undergo various reflections and orientations using a set of mirrors to modify the angle of incidence of the reference beam with respect to the object beam. Thus, by this mechanism angular multiplexing is implemented. In other words, angular multiplexing is carried out by sequentially changing the angle of the reference beam by means of mirrors.

Reading Phase

Retrieving the stored information from the master holographic memory device 180 requires the use of a read beam whose characteristics correspond to those employed for writing or for storage (wavelength, angle of incidence and position within the storage material). This read beam induces diffraction due to perturbation in the refractive index corresponding to the characteristics of the beam, thereby creating the stored modulated beam.

Figure 2:
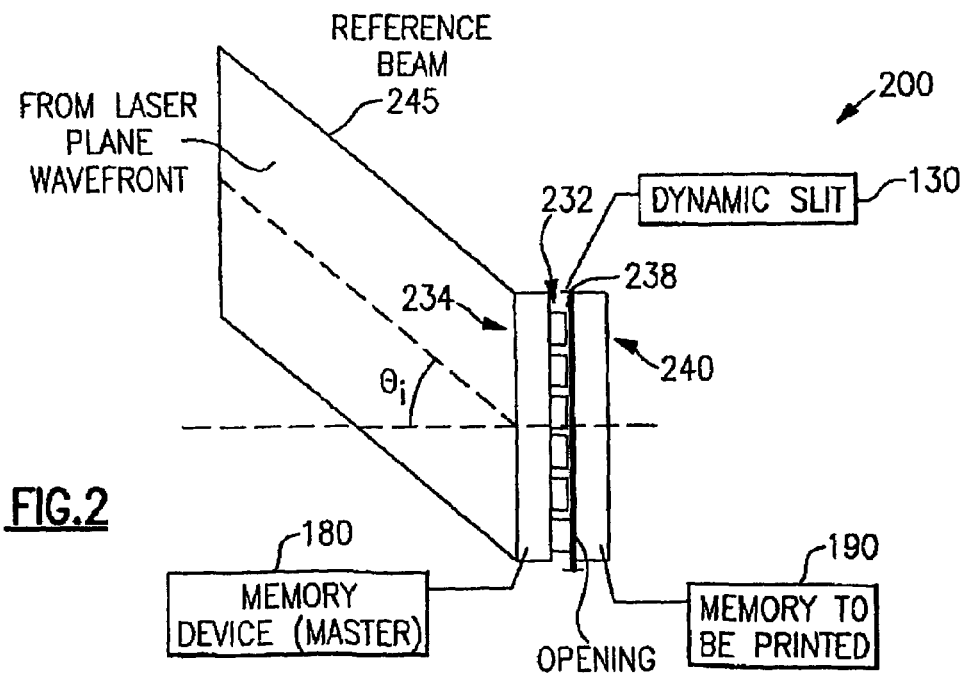
FIG. 2 is a schematic representation of an apparatus for duplicating a transmissive hologram in accordance with one embodiment of the present invention.

The read beam may be controlled by an addressing-read system that includes mirrors or micromirrors associated with actuators, i.e., galvanometers or micromotors, therefore capable of undergoing rotation that allows each mirror to be oriented in the desired direction. These mirrors are positioned at defined points or nodes by software, for the purpose of angularly indexing the wavefront 245 (as shown in FIG. 2) for a point of defined coordinates (X,Y) in the master memory device 180. The laser beam angular processing can also be implemented through dynamic means of grating or acoustic optics or a joint use of both or other microtechnologies.

In angular multiplexing, the read beam is positioned in order to access a data packet contained at a defined point (X,Y) in the master memory device 180 at a corresponding addressing angle. The reading procedure is similar to the writing or recording procedure related to the choice of reference angle values. However, the reading procedure may be carried out with a greater degree of tolerance than the recording procedure. It is possible to use a very compact laser source of a solid-state type for the reading process because the laser power necessary for reading is much lower than the one for recording.

Duplicating Phase

The laser 120 emits the laser beams 125, which are then routed and transformed by the optical unit 140. The optical unit 140 then generates collimated laser beams 145. The collimated laser beams 145 are configured to address the packets in the master holographic memory device 180. In one embodiment, the collimated laser beams 145 are a planar wavefront. The function of the optical unit may include the filtering, adjusting, collimating, and performing diameter fitting of the laser beams 125. Other functions of the optical unit 140 may be routing, rotating, and focusing/defocusing in such way that the laser beams 125 emerging from the optical unit 140 are collimated to produce the collimated laser beam 145. The collimated laser beams 145 output from the optical unit 140 to reach the master holographic memory device 180 with a selected angle and axis-specific geometrical location. It is noted that in a plane of the memory, each page (packet) has a x-y location on the memory device (e.g., master memory device 180) and a specific angle of beam addressing. In other words, the page is addressed with the laser beam positioning on a location (i.e., point of matrix) of the memory device with the angle corresponding to the selected page to be duplicated.

The master holographic memory device 180 is held adjacent and parallel to the holographic plate memory device to be printed 190 by a fixture (not shown). The master holographic memory device 180 and the holographic plate memory to be printed 190 are separated by a gap. A dynamic sliding slit aperture 130 is disposed in the gap between the master memory device 180 and the memory to be printed 190. The master memory device 180 and the memory to be printed 190 are mounted on a rotating table 150, which angularly rotates about an axis of rotation 170. The rotating table 150 is used to change the angle of incidence of the collimated laser beam 145 to effect multiplex duplicating of the hologram reading on the master holographic memory device 180. The dynamic sliding slit aperture 130 is used for controlling multiplexed printing.

To replicate a hologram, illumination of the master memory device 180 by the appropriate collimated laser beam 145 reconstructs the wavefront out of the master hologram 180 carrying multiplexed packets of data. In one embodiment, the apparatus is used to replicate multiple multiplexed holograms of the master memory device 180 onto the memory to be printed 190. As stated above, the angle of incidence of the collimated laser beam 145 changes as the rotating table 150 angularly rotates the collimated laser beam 145. At each angular position, the collimated laser beam 145 reconstructs the wavefront and replicates its corresponding multiplexed hologram. The slit selects a column diffracted wavefront with a specific multiplexing angle without adding noise to other column output data wavefronts and prevents noise from other columns that may deteriorate the duplication process.

Referring now to FIG. 2, there is shown an apparatus for duplicating a transmissive hologram in accordance with one embodiment of the invention. This apparatus 200 comprises the elements shown in the apparatus 100 in FIG. 1, wherein additional details are shown in FIG. 2 for this particular embodiment.

The apparatus 200 includes the master memory device 180, the memory to be printed 190, the dynamic slit 130, and the laser plane wavefront 245. The laser plane wavefront 245 is generated by a continuous wave (cw) or a pulsed laser for duplicating. In one embodiment, the laser plane wavefront generates a pulsed laser. The use of the pulsed laser would accelerate the duplicating process and lower the stability constraints.

The master memory device 180 in this embodiment is a transitive hologram having front 232 and back 234 surfaces. The memory to be printed 190 likewise has front 238 and back 240 surfaces. The dynamic slit aperture 130 is disposed between the master memory unit 180 and the memory to be printed 190 and is held by a fixture (not shown) which permits the linear translation of the dynamic slit 130 across the surface 238 of the memory to be printed 190. As described before, light from the laser 120 comprising the plane wavefront 245 is incident upon the back surface 234 of the master memory device 180 at an angle theta ($\theta_i$) where "i" is a positive integer (i.e., $1 \leq i \leq 20$). This light is diffracted by the diffraction pattern recorded on the master memory device 180 and holographic data is transmitted from the back surface 234 to the front surface 232 of the master memory device 180. The diffracted wavefront passes through the dynamic slit 130 to be printed on, thereby exposing the pattern to the memory to be printed 190 at its front surface 238.

In one embodiment, the master memory device 180 includes an array of pages of data/information, which correspond in size to individual slits or openings in the sliding slit aperture 130. A single column of pages of data thus passes through the dynamic slit aperture 130 and exposes the unexposed memory plate front surface 238 (i.e., polypeptide layer), thereby duplicating the hologram from the master memory device 180 to the memory to be printed 190. In one embodiment, the master memory device 180 and memory to be printed 190 are constructed of organic material, such as a polypeptide material, and made in accordance with the techniques described in the copending patent application entitled "Photonics Data Storage System Using a Polypeptide Material and Method for Making Same," Serial No. PCT/FR01/02386, which is herein incorporated by reference.

Figure 3:
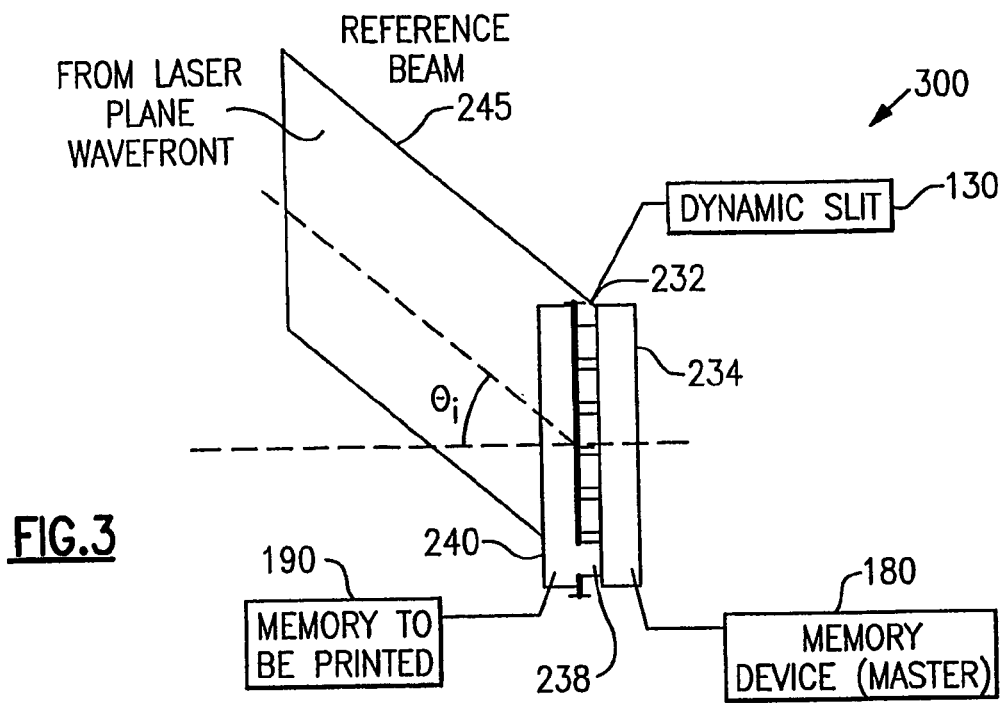
FIG. 3 is a schematic representation of an apparatus for duplicating a reflective hologram in accordance with one embodiment of the invention.

Referring now to FIG. 3, there is shown another embodiment of the present invention, which includes an apparatus 300 for duplicating a reflective hologram. In this embodiment, the master memory device 180 is a reflective hologram having front 232 and rear 234 surfaces. The memory to be printed 190 includes rear 240 and front 238 surfaces. A dynamic slit aperture 130 is disposed between the master memory device 180 and memory to be printed 190. A plane wavefront 245 is incident upon the front surface 232 of the master memory device 180 at an angle theta ($\theta_i$). The plane wavefront 245 is diffracted by the diffracted pattern on the master memory device 180. The diffracted pages of data are propagated from the front surface 232 to the front surface 238 and pass through the slit opening 130. The pages of data beam interfere with the collimated laser beam 245 to form the pattern that is printed on the front surface 238 of the memory to be printed 190. In one embodiment, the front surface 238 is a surface of a polypeptide layer.

FIGS. 2 and 3 describe the duplication of a transmissive hologram and a reflective hologram respectively; however, it is contemplated that any multiplexing methods (i.e., angular multiplexing) may be applied to result in duplication/replication of multiple multiplexed holograms.

Figure 4:
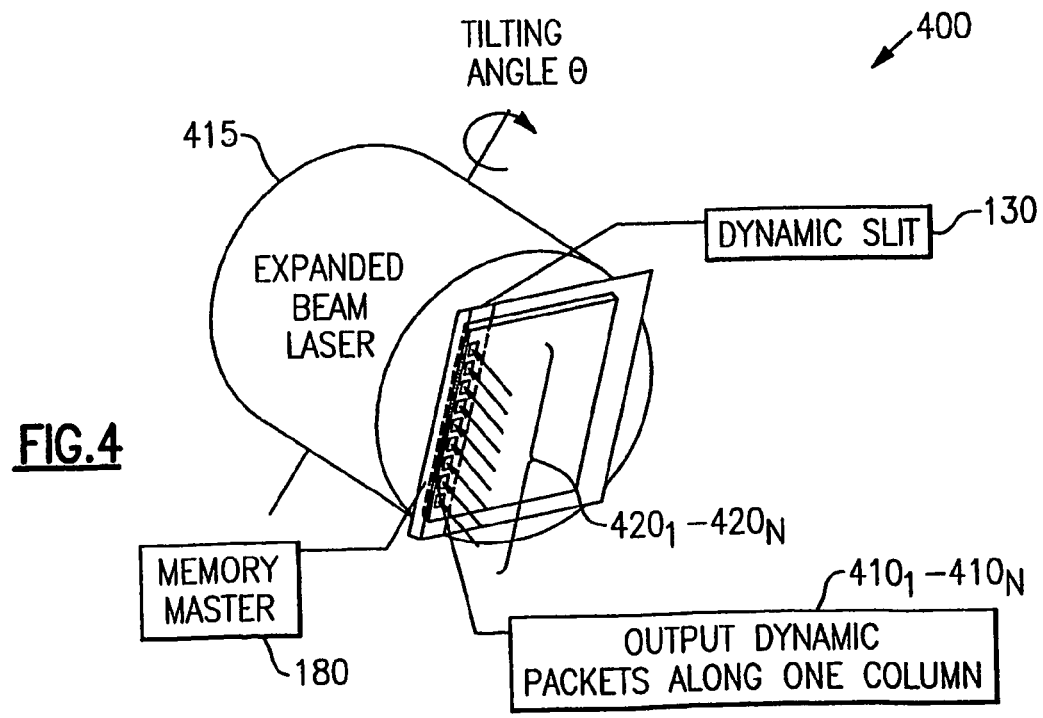
FIG. 4 is a schematic representation of additional details of the apparatus for duplicating holograms shown in FIG. 1.

Referring to FIG. 4, additional details of the apparatus for duplicating holograms in accordance with the present invention are shown. FIG. 4 shows a schematic presentation of an apparatus 400, which may be used in conjunction with the apparatus described above in FIGS. 1-3. Dynamic slit 130 includes a single column of apertures 410 (which includes packages $410_1$ to $410_N$) that corresponds in position and in size to individual pages of data stored on the master memory device 180. The expanded laser beam 415 passes through the dynamic slit individual aperture 410, thereby generating a column of individual beams of light $420_1$ to $420_N$ (with N being positive integer) that output plurality of packets along on a column of information. Each diffractive pattern contains several encoded data packets. This results in transferring from the master memory device 180 (polypeptide layer) at a specific angle to a duplicated plate 190 (polypeptide layer) constituting another recording medium.

To duplicate multiple holograms from the master memory device 180 to another recording medium, i.e., the memory to be printed 190, the expanded and collimated laser beam 415 may be angularly rotated or tilted at a different angle theta ($\theta_i$). When the laser beam 415 emits to the master memory device 180 at the different angle theta ($\theta_i$) and passes through the individual aperture 410 of the dynamic slit 130, another column of pages of data from the master memory device 180 is duplicated onto the memory to be printed 190. In one embodiment, the laser beam is stationary while at least one of the master memory device 180, the slit system 130, and the duplicated memory device 190 is rotating. In another embodiment the laser beam is moving while one or more of the master memory device 180, duplicated memory device 190, and slit system 130 is stationary.

In one embodiment, the dynamic slit 130 may have multiple columns of apertures. Each column is adjusted so that it corresponds in position and in size to the individual pages of data stored in the master memory device 180. Furthermore, each column may selectively be open or closed depending on which data is to be duplicated to the memory to be printed 190. In another embodiment, the dynamic slit 130 may have a single row or multiple rows of apertures. Each row corresponds in position to the specific data stored in the master memory device 180. It is contemplated that the shape and size of the slit or opening 130 may vary depending on the geometrical characteristics of the diffractive pattern from the master memory device 180.

Referring now to FIGS. 5A and 5B, there is shown a schematic representation of an apparatus described in two embodiments used in the duplicating process as described in FIGS. 1-3. The apparatus includes the master memory device 180, a memory to be duplicated 190, an input beam 505 and an output beam 515. The input beam 505 is a collimated laser beam (i.e., collimated laser beam 145 as shown in FIG. 1) that is used as a collimated beam in the duplication setup of the master memory device 180 to the memory to be duplicated 190. The information in the master memory device 180 is to be duplicated to the memory to be duplicated 190 using the output beam 515 as an object beam. This output beam 515 of the master memory device 180 is loaded with data/information in the master memory device 180. In other words, this output beam 515 represents the object beam for memory to be recorded as a duplicate.

The embodiment in 5A describes the situation where the size of the beam including a packet to be copied on the memory to be duplicated 190 is bigger than the size of the beam including a packet of the master memory device 180. The embodiment in 5B describes the situation where the size of the packet of both the master memory devices 180 and the memory to be duplicated 190 is the same. The output beam 515 is controlled to produce the desired duplicating packet size of the memory to be duplicated 190.

FIG. 6 is an optical diagram that illustrates a specific beam processing that induces an output-collimated beam that is used for master memory recording. The diagram is an illustration that shows the choice of lenses used to control the object beam to make holograms of the master memory 180 in accordance with the invention. The optical device 600 includes a spatial light modulator (SLM) 610, a first lens 620, a second lens 630, a first parallel beam 605, a second parallel beam 615, and a focal point A.

The SLM 610 displays the image to be recorded to the master memory device 180 shown in FIGS. 1-4. Output from the SLM 610 is the first parallel object beam 605 having a first beam size $h_1$. The first parallel beam 605 is the object beam that is loaded with data to be recorded to constitute the master memory. The first parallel beam 605 is converged by the first lens 620 to the focal point A. The second lens 630 collimates the beam from the focal point A to the parallel object beam 615 having a second beam size $h_2$. The selection of the first and second lenses 620 and 630 depends on the object beam (packet data beam) size in the master memory device coming from the SLM 610 and the size of packet, which is to be recorded on the memory to be duplicated 190. The focusing length between lenses 620 and 630 is the combination of a first and second distance $f_1$ and $f_2$. The relationship between the object beam 605 having a size $h_1$ and the object beam 615 having the size $h_2$ is defined in the following formula:

$$\frac{h_2}{h_1} = \frac{f_2}{f_1}$$

Where:

$h_1$ is the size of the parallel collimated object laser beam between the SLM 610 and lens 620.

$h_2$ is the size of the parallel collimated object laser beam after lens 630. This beam size is going to be the size of one point in the master memory (i.e., master memory device 180).

$f_1$ is the focal length of lens 620 converging to focal point A.

$f_2$ is the focal length of lens 630 diverging from focal point A.

The present invention is not to be limited in scope by the specific embodiments described herein. Indeed, this application is intended to cover any modifications of the present invention, in addition to those described herein, and the present invention is not confined to the details which have been set forth. Thus, the scope of the invention should be determined by the appended claims and their legal equivalents, rather than by the examples given.

What is claimed is:

1. An apparatus for duplicating holographic memory comprising:
    a master memory device having a plurality of pages of information stored thereon;
    an unexposed memory device adjacent and parallel to the master memory device, the unexposed and master memory devices being separated by a gap;
    an aperture unit disposed in the gap having a plurality of dynamic slits, wherein each dynamic slit corresponds to an individual page of memory in the master, the aperture unit being located in front of the master memory device such that the dynamic slits correspond to selected ones of the pages of information; and
    a light source generating an input beam that transfers memory data from the master memory device to the unexposed memory device, and a reference beam for registering the data in the unexposed memory device.

2. The apparatus according to claim 1 further comprising a fixture to hold the master memory device parallel to the unexposed memory device.

3. The apparatus according to claim 2 further comprising a rotating table having a planar top surface and an axis rotation orthogonal to the top surface, the fixture being disposed on the rotating table such that the planar face of the master and unexposed memory devices are orthogonal to the top face of the table.

4. The apparatus according to claim 3 wherein the input beam passes through the master memory device and then reaches the unexposed memory device.

5. An apparatus according to claim 4 wherein the master memory device is a transmissive hologram.

6. The apparatus according to claim 5 wherein the unexposed and master memory devices have front and rear sides and are disposed such that the master rear side is adjacent and parallel to the front side of the unexposed device, and the input beam is incident on the front side of the master and the unexposed device is disposed such that the beam is incident on its front side after passing through the master and the aperture.

7. The apparatus according to claim 6 wherein the master and the unexposed memory devices' rear sides are supported by a polypeptide layer.

8. The apparatus according to claim 1 wherein the input beam is a plane wavefront.

9. The apparatus according to claim 1 wherein the unexposed and master memory devices have front and rear sides and are disposed such that the front side of the master is adjacent and parallel to the front side of the unexposed device and wherein the input beam is diffracted off the master unit and reaches the front side of the unexposed memory device to data beams diffracted by the master memory device.

10. The apparatus according to claim 9 wherein the master memory device is a reflective hologram.

11. The apparatus according to claim 10 wherein the master memory device is disposed such that the input beam is incident on the front side of the master memory unit and diffracted off the front surface and the unexposed memory device is disposed such that the diffracted beam is incident on the front side of the unexposed memory device.

12. The apparatus according to claim 11 wherein the input beam is a plane wavefront.

13. The apparatus according to claim 1 wherein the master and unexposed memory devices comprise an organic material.

14. The apparatus according to claim 13 wherein the organic material is a polypeptide material.

15. An apparatus for duplicating holographic memory comprising:
a master memory device having a page of information stored thereon;
an unexposed memory device adjacent and parallel to the master memory device, the unexposed and master memory devices being separated by a gap;
an aperture unit disposed in the gap having a plurality of dynamic slits wherein each dynamic slit corresponds to the individual page in the master, the aperture unit being located in front of the master memory device such that the opening corresponds to the page of information; and
a light source generating a input beam that transfers memory data from the master memory device to the unexposed memory device, and a reference beam for registering the data in the unexposed memory device.

16. The apparatus according to claim 15 further comprising a fixture to hold the master memory device parallel to the unexposed memory device.

17. The apparatus according to claim 16 further comprising a rotating table having a planar top surface and an axis rotation orthogonal to the top surface, the fixture being disposed on the rotating table such that the planar face of the master and unexposed memory devices are orthogonal to the top face of the table.

18. The apparatus according to claim 17 wherein the input beam passes through the master memory device to reach the unexposed memory device.

19. The apparatus according to claim 18 wherein the master memory device is a transmissive hologram.

20. The apparatus according to claim 19 wherein the unexposed and master memory devices have front and rear sides and are disposed such that the master rear side is adjacent to the front side of the unexposed unit, and the input beam is incident on the front side of the master and the unexposed unit is disposed such that the beam is incident on its front side after passing through the master and the aperture.

21. The apparatus according to claim 15 wherein the input beam is a plane wavefront.

22. The apparatus according to claim 15 wherein the unexposed and master memory devices have front and rear sides and are disposed such that the front side of the master is adjacent and parallel to the front side of the unexposed unit and wherein the input beam is diffracted off the master unit and reaches the front side of the unexposed memory unit to expose the unexposed memory unit to the diffractive memory pattern on the master.

23. The apparatus according to claim 22 wherein the front side of the unexposed and the rear side of the master memory device includes a polypeptide layer.

24. The apparatus according to claim 22 wherein the master memory device is a reflective hologram.

25. The apparatus according to claim 24 wherein the master memory device is disposed such that the input beam is incident on the front side of the master memory unit and diffracted off the front surface and the unexposed memory unit is disposed such that the diffracted beam is incident on the front side of the unexposed memory unit.

26. The apparatus according to claim 25 wherein the input beam is a plane wavefront.

27. The apparatus according to claim 15 wherein the master and unexposed memory devices include diffraction patterns, which function as a lens whereby the reference beam is collimated when passing through the master.

28. The apparatus according to claim 15 wherein the master and unexposed memory devices comprise an organic material.

29. The apparatus according to claim 28 wherein the organic material is a polypeptide material.

30. A method for duplicating holographic memory comprising:
providing a master memory device having a page of information stored thereon;
providing an unexposed memory device adjacent and parallel to the master memory device, the unexposed and master memory devices being separated by a gap;
disposing an aperture unit in the gap having a plurality of dynamic slits wherein each dynamic slit corresponds to an individual column of pages of memory in the master, the aperture unit being located in front of the master memory device such that the opening corresponds to a selected page of information; and
generating n input beam from a light source that transfers memory data from the master memory device to the unexposed memory device, and a reference beam for registering the data in the unexposed memory device.

31. The method according to claim 30 further comprising providing a fixture to hold the master memory device parallel to the unexposed memory device.

32. The method according to claim 31 further comprising rotating a table having a planar top surface and an axis rotation orthogonal to the top surface, the fixture being disposed on the rotating table such that the planar face of the master and unexposed memory devices are orthogonal to the top face of the table.

33. The method according to claim 32 wherein the input beam passes through the master memory device to reach the unexposed memory device.

34. The method according to claim 33 wherein the master memory device is a transmissive hologram.

35. The method according to claim 34 wherein the unexposed and master memory devices have front and rear sides and are disposed such that the master rear side is adjacent and parallel to the front side of the unexposed unit, and the input beam is incident on the front side of the master, and the unexposed unit is disposed such that the beam is incident on its front side after passing through the master and the aperture.

36. The method of claim 35 wherein the front side of the master memory device and the rear side of the unexposed memory device include a polypeptide layer.

37. The method according to claim 30 wherein the input beam is a plane wavefront.

38. The method according to claim 30 wherein the unexposed and master memory devices have front and rear sides and are disposed such that the front side of the master is adjacent and parallel to the front side of the unexposed unit and wherein the input beam is reflected off the master unit and reaches the front side of the unexposed memory unit to expose the unexposed memory unit to the diffractive patterns on the master.

39. The method according to claim 38 wherein the front side of the master memory device and the rear side of the unexposed memory device include a polypeptide layer.

40. The method according to claim 39 wherein the master memory device is a reflective hologram.

41. The method according to claim 40 wherein the master memory device is disposed such that the input beam is incident on the front side of the master memory unit and reflected off the front surface, and the unexposed memory unit is disposed such that the reflected beam is incident on the front side of the unexposed memory unit.

42. The method according to claim 40 wherein the input beam is a plane wavefront.

43. A system comprising:
a laser device generating a coherent light; an optical unit connected to the laser device to collimate the laser light beam; and
a duplication device connected to the optical unit to receive the collimated laser light beam, the duplicating device comprising:
a master memory device having a page of information stored thereon,
an unexposed memory device adjacent and parallel to the master memory device, the unexposed and master memory devices being separated by a gap, and
an aperture unit in the gap having a plurality of dynamic slits wherein each dynamic slit corresponds to the page of memory in the master, the aperture unit being located in front of the master memory device such that the opening corresponds to the page of information;
a collimated light beam from the optical unit that transfers memory data from the master memory device to the unexposed memory device; and
a reference beam from the optical unit for registering the data in the unexposed memory device.

44. The system according to claim 43 further comprising a fixture to hold the master memory device parallel to the unexposed memory device.

45. The system according to claim 44 further comprising a rotating table having a planar top surface and an axis rotation orthogonal to the top surface, the fixture being disposed on the rotating table such that the planar face of the master and unexposed memory devices are orthogonal to the top face of the table.

46. The system according to claim 45 wherein the collimated beam passes through the master memory device to reach the unexposed memory device.

* * * * *